(12) United States Patent
Abe et al.

(10) Patent No.: US 6,815,103 B2
(45) Date of Patent: Nov. 9, 2004

(54) START CONTROL DEVICE FOR FUEL CELL SYSTEM

(75) Inventors: Hiroyuki Abe, Utsunomiya (JP); Yutaka Asano, Utsunomiya (JP); Mitsuru Kai, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 247 days.

(21) Appl. No.: 10/118,637

(22) Filed: Apr. 8, 2002

(65) Prior Publication Data

US 2002/0146602 A1 Oct. 10, 2002

(30) Foreign Application Priority Data

Apr. 10, 2001 (JP) .................................. P2001-111702

(51) Int. Cl.$^7$ .............................................. H01M 8/04
(52) U.S. Cl. ........................... 429/13; 429/24; 429/25; 429/26
(58) Field of Search ............................ 429/13, 22, 23, 429/24, 25, 26

(56) References Cited

U.S. PATENT DOCUMENTS 5,798,186 A     8/1998   Fletcher et al. ............... 429/13
6,428,919 B1 *  8/2002   Takahashi et al. ......... 429/26 X
6,551,731 B1 *  4/2003   Berg et al. .................... 429/13
6,593,018 B2 *  7/2003   Ruoff et al. .................. 429/22
6,596,425 B2 *  7/2003   Mirsch et al. ................ 429/26
6,616,424 B2 *  9/2003   Raiser ....................... 429/23 X
2001/0053469 A1 * 12/2001 Kobayashi et al. ........... 429/26

* cited by examiner

Primary Examiner—Stephen J. Kalafut
(74) Attorney, Agent, or Firm—Lahive & Cockfield, LLP; Anthony A. Laurentano, Esq.

(57) ABSTRACT

At a time of starting a fuel cell when solenoids of control valves such as a check valve and a discharge valve are in a frozen state, hot air obtained by adiabatic compression at an air supply portion is divisionally supplied into a warm-up box through a warm-up valve. It is determined whether the discharge valve is opened by determining whether the discharge fuel gas pressure Pout is reduced below a predetermined pressure while the check valve is in an opened state. After confirming that the discharge valve has been opened, it is determined whether the check valve can be closed by determining whether the pressure near the fuel supply port of the fuel cell has risen above the predetermined pressure stored in the memory. The warm-up operation of the fuel cell can thereby be efficiently conducted and the fuel cell can be reliably started.

9 Claims, 4 Drawing Sheets

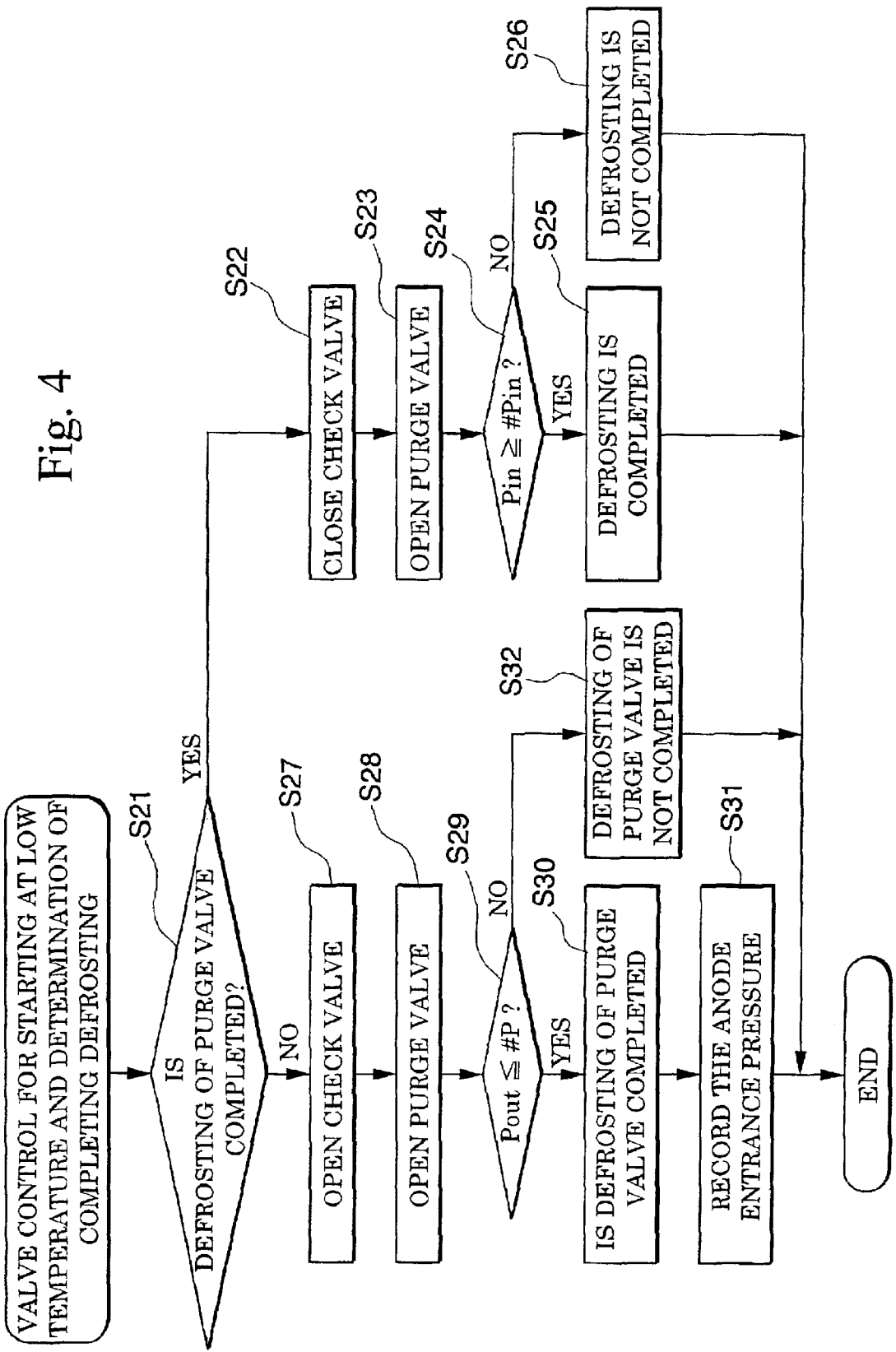

START CONTROL DEVICE FOR FUEL CELL SYSTEM

BACKGROUND OF THE INVENTION

1. Field of the Invention

The present invention relates to a start control device for a fuel cell system and, in particular, relates to a technology to heat control valves disposed in a passage of a reaction gas for the fuel cell.

2. Background Art

A fuel cell in which a membrane electrode assembly is provided by sandwiching a solid polymer electrolyte membrane with an anode electrode and a cathode electrode and by sandwiching the outside of the membrane electrode assembly with a pair of separators is known. In this type of fuel cell, when a fuel gas (for example, hydrogen gas) is supplied to a power generating surface of the anode electrode and an oxidant gas (for example, air containing oxygen) is supplied to a power generating surface of the cathode electrode, a chemical reaction takes place, an external circuit collects electrons generated by the electrochemical reaction, and a direct current to be used as electrical energy is output from the circuit as the output energy of the fuel cell. Since oxidant gas (for example, air containing oxygen) is supplied to the cathode electrode, the reactions between hydrogen ions, electrons, and oxygen produce water. Accordingly, fuel cells have attracted attention as driving sources for vehicles because fuel cells have very little effect on the environment.

In general, the operating temperature of the aforementioned type of fuel cell is in a range of 70 to 80° C. Since power generation efficiency is low at temperatures below the normal operating temperature, a problem arises in that starting of the fuel cell at a low temperature is quite difficult. Thus, when the fuel cell is used as a power source of a vehicle, a problem occurs in that it takes a long time for the vehicle to start to move when the outside temperature is low, for example, when the outside temperature is below freezing.

For example, a technique to start a fuel cell is proposed in Published Japanese Translation of PCT Application No. 2000-512068, in which the starting of the fuel cell at a low temperature is facilitated by heating the fuel cell accompanied with an accelerated reaction by applying electric power to an external load of the fuel cell.

U.S. Pat. No. 6,103,410 discloses a technique to facilitate starting of a fuel cell at a low temperature by generating heat in the fuel cell due to a combustion reaction initiated by the cathode catalyst when a part of the fuel, that is, hydrogen is mixed with air and combusted.

However, although the aforementioned conventional techniques may possibly melt the frozen state of condensed water in the fuel cell stack, it may not be possible to cope with the frozen states of the check valve provided in the gas passage of the exhaust gas from the fuel cell or the solenoid of the exhaust valve (a purge valve). When the outside temperature is below zero, the water contained in the exhaust gas is frozen, and the control valves will fail to function due to immobilization by frozen water.

SUMMARY OF THE INVENTION

It is therefore an object of the present invention is to solve the aforementioned problems and to provide a start control device for fuel cells capable of efficiently performing a warm-up operation at the time of starting a fuel cell and capable of efficiently starting the fuel cell.

In order to overcome the above described problems, the first aspect of the present invention provides a start control device for a fuel cell system which comprises an oxidant gas supply device (for example, air supply portion 12 in the embodiment) for supplying to the fuel cell the oxidant gas (for example, air, in the embodiment) obtained by adiabatic compression, control valves provided in the gas passage for discharging a reacted gas (for example, a reacted fuel gas being discharged in the embodiment) discharged from the fuel cell, a control valve heating device (for example, step S09 in the embodiment) for heating said control valves (for example, a check valve 23 and a discharge valve 24 in the embodiment) by heat exchange with the oxidant gas supplied from the oxidant gas supply device.

By providing the start control device for the fuel cell as described above, when air heated by adiabatic compression by a compressor is supplied to the fuel cell as an oxidant gas, such heated air is directly blown on the control valves such as a check valve or a discharge valve, which are disposed in a passage for discharging a reacted gas from the fuel cell. Even when respective solenoids of the control valves and the discharge valve are frozen by residual water because the fuel cell is placed in a low temperature subzero external atmosphere, it is possible to defrost the frozen valves and to decrease the time required for starting the fuel cell.

In addition, the above start control device makes it possible to conduct an efficient heating operation by utilizing thermal energy obtained by adiabatic compression of the oxidant gas without providing a particular device for heating control valves.

According to the second aspect of the present invention, in the aforementioned start control device for a fuel cell system, the start control device further comprises an oxidant gas dividing supply device (for example, oxidant gas passage 28a and flow dividing passage 28c in the embodiment) for divisionally supplying the oxidant gas supplied from the oxidant gas supply device.

By providing the above-described structure, the heated oxidant gas is supplied to the fuel cell in addition to the control valve heating device, and the control valves and the fuel cell are heated so that it is possible to reduce the time required for heating the entire fuel cell system.

According to the third and fourth aspects of the present invention, the aforementioned start control device for a fuel cell system comprises a defrosted state determination device (for example, a control device described below) for determining whether the control valves in a frozen state are defrosted, an oxidant gas supply control device (for example, warm up flow dividing device 26 in the embodiment) for supplying or for stopping the supply of the oxidant gas from the oxidant gas supply device to the control valve heating device, wherein the oxidant gas supply control device stops supplying the oxidant gas from the oxidant gas supply device to the control valve heating device when it is determined by the defrosted state determination device that the control valves are defrosted.

By providing the start control device as described above, since the oxidant gas is supplied to the control valve heating device after the control valves are defrosted, it is possible to conduct a defrosting operation in an efficient manner by preventing the supply of excess oxidant gas to the control valve heating device.

According to the fifth aspect of the present invention, in the start control device for a fuel cell system, the defrosted state determination device determines the defrosted state of the control valves by change of pressure of the reaction gas detected in response to control commands to open or to close the control valves.

By providing the start control device for the fuel cell as described above, it can be determined that the control valves are defrosted by determining whether the control valves can be opened or closed in response to the opening and closing commands based on detecting the pressure at supply and discharge ports of those valves.

According to the sixth aspect of the present invention, in the start control device for a fuel cell system, the start control device further comprises a power generation start device (for example, step S08 in the embodiment) for starting power generation of the fuel cell, and the generation starting device starts power generation when it is determined by the defrosted state determination device that the control valve is defrosted.

By providing the start control device for the fuel cell as described above, since the power generation is started after confining that the control valve for controlling the discharge gas can be operated normally, the fuel cell can generate power without reducing power generation efficiency.

According to the seventh aspect of the present invention, in the start control device for a fuel cell system, a plurality of control valves are integrally arranged in a common box (for example, a warm-up box in the embodiment), in which the oxidant gas supplied from the oxidant gas supply device can be distributed.

By providing the start control device for the fuel cell as described above, since plural control valves are integrally arranged in a common box, the heated oxidant gas can be efficiently used for heating these control valves, eliminating diffusion of the heated oxidant gas.

BRIEF DESCRIPTION OF THE DRAWINGS

FIG. 4 is a flowchart showing an operation at step S10 including a control operation of valves at the time of starting the fuel cell at a low temperature region and a control process for determining completion of defrosting.

DETAILED DESCRIPTION OF THE INVENTION

A start control device of a fuel cell according to one embodiment of the present invention is described below with reference to the attached drawings.

Figure 1:
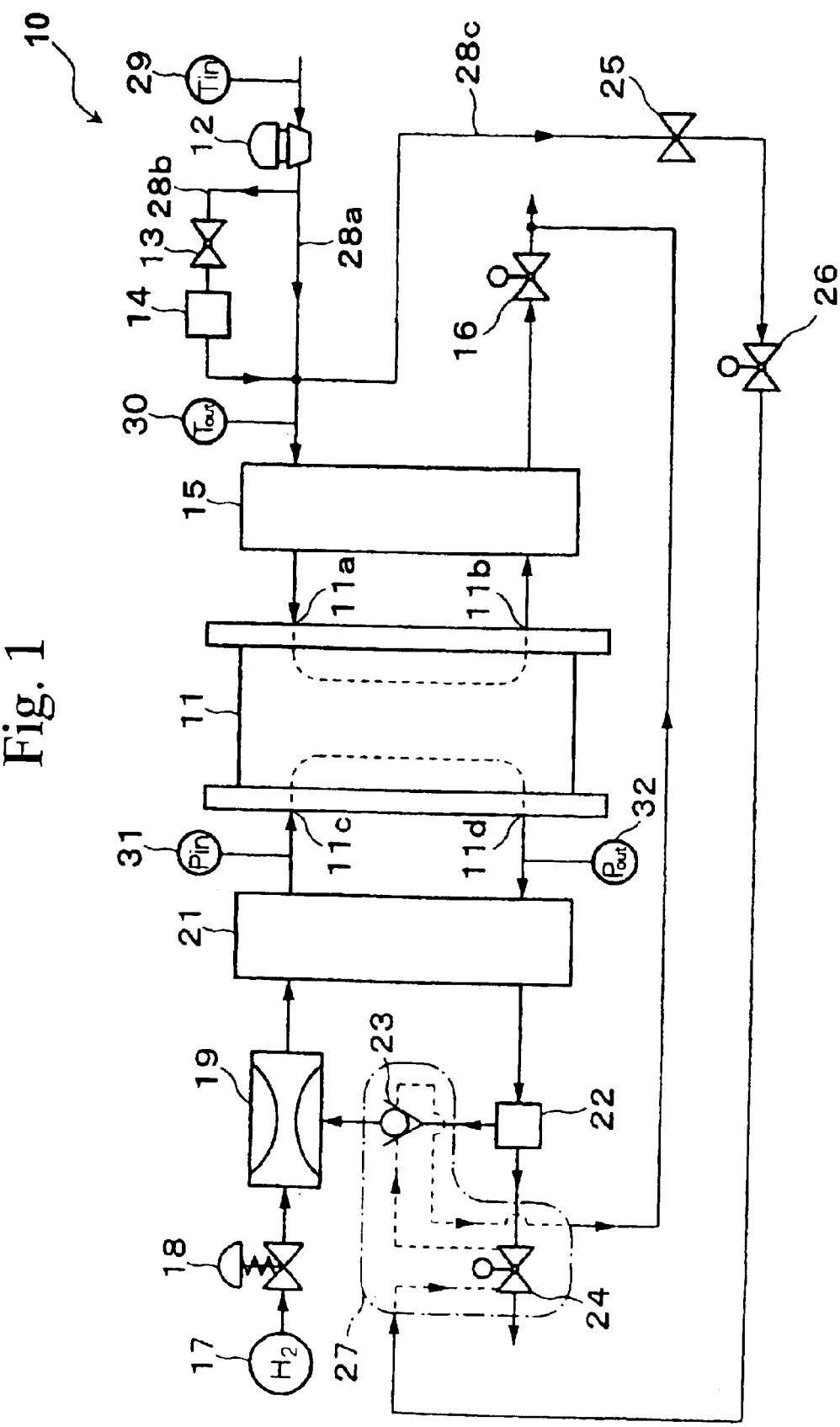
FIG. 1 is a diagram showing a structure of a start control device of a fuel cell according to one embodiment of the present invention.
Figure 2:
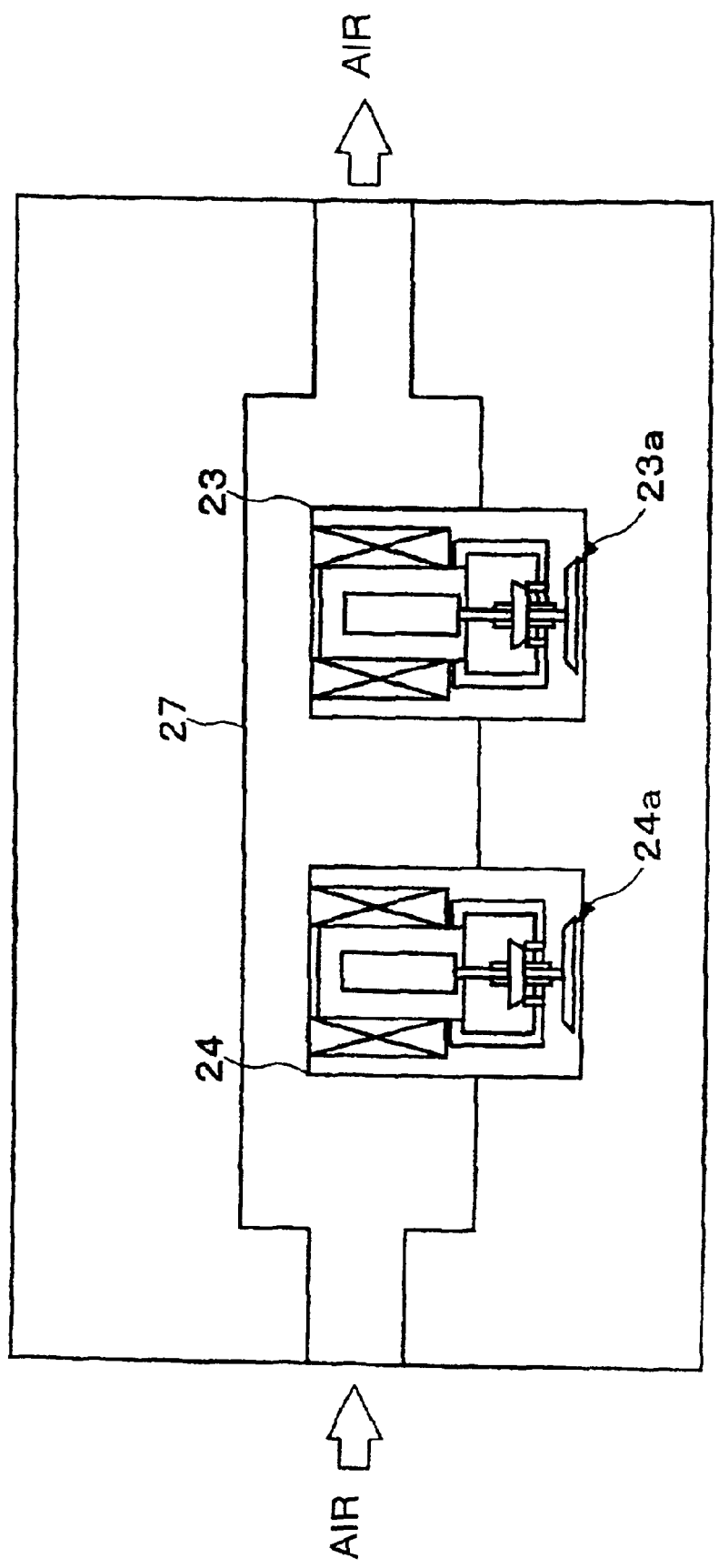
FIG. 2 is a cross-sectional view of a warm-up box shown in FIG. 1.

FIG. 1 is a diagram showing a structure of a start control device of a fuel cell according to one embodiment of the present invention, and FIG. 2 is a cross-sectional view of a warm-up box shown in FIG. 1.

The control device 10 according to one embodiment of the present invention is installed in, for example, an electric vehicle, and the control device 10 comprises a fuel cell 11, an oxidant supply portion 12, a bypass valve 13, a heat exchanger 14, an oxidizer humidifier 15, a back pressure portion 16, a fuel supply portion 17, a first pressure flow control valve 18, an ejector 19, a fuel humidification portion 21, a liquid separating portion 22, a check valve 23, a discharge valve 24, an orifice 25, and a warm up flow dividing valve 26.

The fuel cell 11 is constituted by a fuel cell stack composed by stacking a plurality of cells each formed by sandwiching both sides of a solid polymer electrolyte membrane, corresponding to, for example, a solid polymer ion exchange membrane, by an anode and a cathode, and the fuel cell 11 is provided with a fuel electrode, to which a fuel gas such as hydrogen is supplied, and an air electrode, to which air containing oxygen as an oxidant gas is supplied.

The air electrode of the fuel cell 11 is provided with an air supply port 11a for supplying air from the oxidant supply portion 12 and an air discharge port 11b for discharging air and the like in the air electrode to the outside. In contrast, the fuel electrode is provided with a fuel supply port 11c for supplying hydrogen and a fuel discharge port 11d for discharging hydrogen and the like in the fuel electrode.

The air supply portion 12, constituted by, for example, an air compressor, is controlled by input signals in response to loads of the fuel cell 11 and the accelerator pedal (not shown) and supplies compressed air to the air electrode of the fuel cell 11 or to the warm-up box 27, described below.

Furthermore, a bypass passage 28b, detouring around an oxidant gas passage 28a, is provided at an oxidant gas passage 28a, connecting the air supply portion 12 with the oxidant humidifier 15.

The aforementioned bypass passage 28b is provided with a heat exchanger 14, to which a high temperature gas, adiabatically compressed at the air supply portion 12, is supplied through a bypass valve 13, and the heat exchanger 14 supplies the high temperature air after being cooled to a predetermined temperature to the air supply port 11a of the fuel cell 11.

A flow dividing passage 28c for supplying high temperature air, after being adiabatically compressed at the air supply portion 12 to the warm-up box 27, is provided at the oxidant gas passage 28a. This flow dividing passage 28c is provided with, for example, a fixed type orifice 25 and a warm-up air flow dividing valve 26, and an opening and closing movement of the warm-up air flow dividing valve 26 controls supply and stop of supplying high temperature air to the warm-up box 27.

Note that the oxidant humidifier 15 utilizes the discharging oxidant gas discharged from the air discharge port 11b of the fuel cell 11 as a humidifying gas for the oxidant gas (that is, air) supplied from the air supply portion 12 to the air supply portion 11a of the fuel cell 11. That is, for example, when the oxidant gas is made to contact the discharged oxidant gas through a water permeable membrane such as a hollow fiber membrane, the water content (particularly, vapor) contained in the discharged oxidant gas is supplied to the oxidant gas as vapor through pores of the hollow fiber membrane.

Hydrogen as the fuel gas is supplied to the fuel electrode of the fuel cell 11 through a fuel supply portion 17, the first pressure flow control valve 18, the ejector 19, and a second pressure flow control valve 20.

In addition, the fuel gas, which is discharged from the fuel discharge port 11d of the fuel cell as non-reacted fuel gas, is introduced sequentially to the liquid separating portion 22, the check valve 23, and to the ejector 19, and the fuel gas supplied from the first pressure flow control valve 18 and the discharged fuel discharged from the fuel cell 11 is mixed and the mixture is again supplied to the fuel cell 11.

Note that an inlet pressure sensor 31 for detecting a pressure of the fuel gas to be supplied to the fuel cell 11 is provided in proximity to the fuel supply port 11a, and an outlet pressure sensor 32 is provided for detecting the pressure of the fuel gas discharged from the fuel cell in proximity to the fuel discharge port 11d.

The ejector 19 absorbs the discharged fuel gas discharged from the fuel cell 11 as the subsidiary flow by a negative pressure generated by high speed fuel gas flowing in the ejector 19, and thereby the fuel gas discharged from the fuel cell 11 is distributed by supplying the discharged fuel gas to the fuel cell 11 after mixing with the fuel gas supplied through the first pressure flow control valve and forms a circulating passage.

The fuel gas humidifier 21 utilizes the discharge gas discharged from the fuel discharge port 11d of the fuel cell 11 as the humidifying gas for the fuel gas (that is, hydrogen), which is supplied to the fuel supply port 11c of the fuel cell 11 from the fuel supply portion 17. That is, when the fuel gas is in contact with the discharged fuel gas through a water permeable membrane such as the hollow fiber membrane, the water content (particularly, water vapor) in the discharged fuel gas is supplied to the fuel gas after permeating through the hollow fiber membrane.

The liquid separating portion 22 performs a liquid separation for the discharged fuel gas after being discharged from the fuel discharge port 11d of the fuel cell 11 and subsequently passing through the fuel gas humidifier 21, and after the liquid water content is removed, the discharged fuel gas is stored.

Here, as shown in FIG. 2, the control valves provided at the discharge gas passage such as the check valve 28 and the discharge valve 24 are contained in the warm-up box 27, and introduction of hot air into the warm-up box 27 through the warm-up dividing valve 26 makes it possible to blow hot air directly for defrosting respective frozen solenoids 23a and 24a of check valve 23 and the discharge valve 24.

The control device 10 for starting the fuel cell according to the present embodiment is constructed as described above.

Hereinafter, operations of the above-described control device 10 for starting the fuel cell are described with reference to attached drawings.

Figure 3:
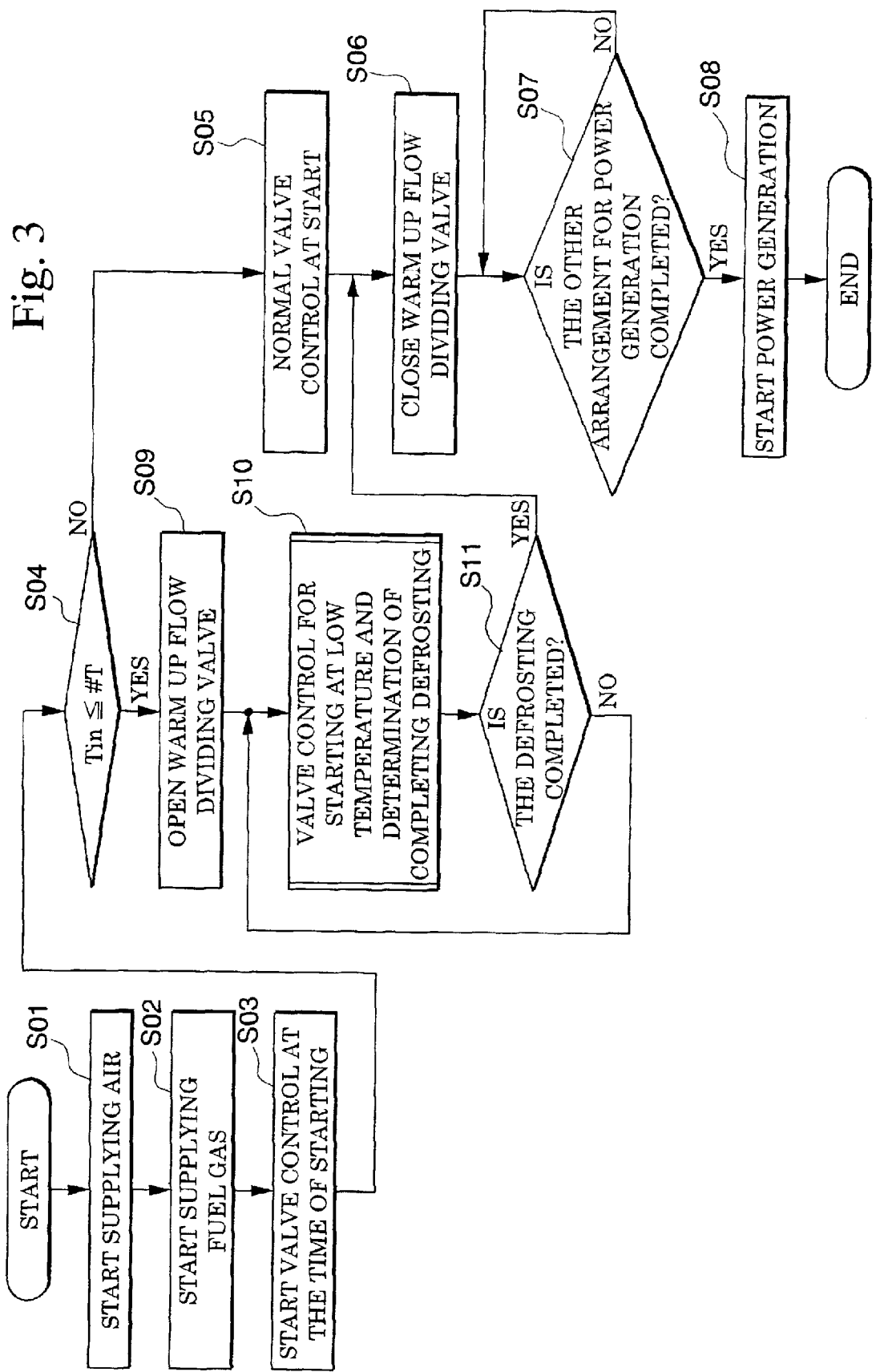
FIG. 3 is a flowchart showing an operation of the start control device of a fuel cell shown in FIG. 1.

FIG. 3 is a flowchart showing an operation of the start control device of a fuel cell shown in FIG. 1. FIG. 4 is a flowchart showing an operation at step S10 including a control operation of valves at the time of starting the fuel cell at a low temperature region and a control process for determining completion of defrosting. In addition, output signals from respective sensors are input into the control device (not shown) and the control device controls the operations of respective control valves.

In step S01 shown in FIG. 3, the air supply portion 12 starts to supply air. In step S02, the fuel gas supply portion 17 starts to supply the fuel gas.

Subsequently, in step S03, the control operation of valves at the start time begins.

Subsequently, in step S04, it is determined whether the external temperature Tin detected by, for example, an intake air temperature sensor 29 is below a low external temperature, which is below a predetermined temperature #T.

When the determination in step S04 is "YES", it is determined that the control valves (such as the check valve 23 or the discharge valve 24) are frozen, and the flow proceeds to step S09. When the determination in step S04 is "NO", it is determined that the control valves can move normally, and the step proceeds to step S05.

In step S05, the regular starting operations begin, such as by outputting commands to close the check valve 23 and to open the discharge valve 24.

In step S06, the warm up dividing valve 26 is closed, and in step S07, it is determined whether the fuel cell 11 is ready to start generating power. Here, it is determined that the fuel cell is ready to start generating power when an opening voltage (OCV) of the fuel cell 11 reaches a predetermined voltage.

When the determination in step S07 is "NO", the flow returns to step S07. In contrast, when the determination is "YES", the flow proceeds to step S08.

In step S08, the flow for starting the fuel cell is completed by starting generation of power and by supplying electric power generated by the fuel cell to external loads.

In contrast, in step S09, the dividing valve 26 for warming up is opened and by supplying an adiabatically compressed oxidant gas into the warm-up box 27, control valves (such as the check valve 23 and the discharge valve 24) are heated by the heat exchange process of the control valves with the oxidant gas.

In step S10, it is determined whether a valve control operation at a time of starting at low temperature range, which will be described below, and a defrosting operation, are completed.

Subsequently, in step S11, it is determined whether the defrosting operation is completed.

When the determination in step S11 is "NO", the flow returns to step S10, and when the determination is "YES", the flow proceeds to step S06.

Hereinafter, the valve control operation when the vehicle is started at a low temperature and the defrosting operation in step S10 will be explained.

In step S21 shown in FIG. 4, it is determined whether a defrosting operation of, for example, the frozen discharge valve (purge valve) 24 has been completed.

When the determination is "NO", the flow proceeds to step S27, described below, and when the determination is "YES", the flow proceeds to step S22. (The first determination after starting the fuel cell is "NO", and the flow proceeds to step S27).

In step S22, a command to close the check valve 23 is output and in subsequent step S23, a command to open the discharge valve (purge valve) 24 is output.

In step S24, it is determined whether the fuel gas pressure Pin, which is detected by the inlet pressure sensor 31 and is to be supplied to the fuel cell 11, exceeds a predetermined memory value #Pm.

When the determination is "YES", the flow proceeds to step S25, wherein it is determined that a series of defrosting operations has been finished (that is, it is determined that both control valves, i.e., the check valve 23 and the discharge valve 24, are defrosted and the defrosting operation in step S11 is completed, and the flow is completed.

In contrast, when the determination is "NO", the flow proceeds to step 26, wherein it is determined that a series of defrosting operations is not completed, and the flow is completed.

In contrast, in step S27, a command to defrost the check valve 23 is output and in subsequent step S28, a command to open the discharge valve (purge valve) 24 is output.

In step S29, it is determined whether the discharged gas pressure Pout, which is detected by the outlet pressure sensor 32 and is discharged from the fuel cell 11, is below a predetermined pressure #P.

When the determination is "YES", the flow proceeds to step S30, wherein it is determined that the discharge valve (purge valve) 24 has been defrosted.

Subsequently, in step S31, a fuel gas pressure Pin, which is detected by the inlet pressure sensor 31 and is to be supplied to the fuel cell 11 is stored in the memory as a memory value #Pm, and the routine process flow is completed.

In contrast, when the determination in step S29 is "NO", the flow proceeds to step S32, wherein it is determined that the defrosting operation of a discharge valve (purge valve) is not completed and the routine process flow is completed.

That is, when the fuel cell 11 is started at a low temperature wherein respective solenoids of the check valve 23 and the discharge valve 24 are frozen, high temperature air adiabatically compressed at the air supply portion 12 is diverged and supplied to the warm-up box 27 which receives the check valve 23 and the discharge valve 24.

Here, when the check valve is in a frozen state, a nonreturn function, that is, a function to limit the fuel stream flowing from the ejector to the liquid separating portion is damaged, and the check valve 23 is maintained in the closed position.

When the discharge valve 24 is in a frozen state, the discharge function, for example, is lost, and the fuel cell is in a locked state because the discharge valve 24 is closed.

Accordingly, it is determined whether the discharge valve 24 is defrosted by examining whether the discharge valve 24 can be opened while maintaining the check valve 23 in the open state. When the discharge valve 24 is opened, the discharge fuel gas pressure Pout in the vicinity of the discharge port of the fuel cell 11 decreases towards the outlet of the discharge valve 24.

When the defrosting operation of the discharge valve 24 is completed, it is determined whether the check valve 23 is defrosted by examining whether the check valve can be opened actually. When the check valve 23 is opened, the fuel gas pressure Pin in the vicinity of the fuel supply port 11c of the fuel cell 11 increases.

As described above, the start control device 10 of the fuel cell according to the present embodiment utilizes hot air obtained by dividing adiabatically compressed air obtained by the air supply portion 12, which corresponds to an compressor for defrosting respective solenoids of the check valve 23 and the discharge valve 24, which is likely to be in the frozen state due to residual water, it is possible to efficiently conduct defrosting operations of those valves by effective utilization of thermal energy due to compression heating by use of a compressor without necessitating provision of a particular device for heating control valves.

Furthermore, since the check valve 23 and the discharge valve 24 are concentrically disposed in the warm-up box, these valves can be defrosted merely by introducing hot air into the warm-up box, which results in improving defrosting efficiency.

In addition, since division of hot air into the warm-up box is controlled by an opening or closing operation of the warm up air flow dividing valve 26, and since the air flow into the warm-up box can be stopped merely by closing the warm-up air flow dividing valve 26, it is possible to prevent unnecessary consumption of air, which contains oxidant gas for the fuel cell 11, and to restrict power consumption for driving the compressor, which result in accomplish the defrosting operation efficiently.

Note that the warm-up operation is not limited to the defrosting operation described in this embodiment, in which hot air, obtained by adiabatic compression in the air supply portion 12, is blown on control valves such as the check valve 23 and the discharge valve 24, provided in the fuel gas passage, and a variant thereof may be conducted, in which aforementioned hot air is blown on the back pressure valve 16.

In addition, it may be possible to conduct the warm-up operation by providing a common warm-up box, in which a plurality of control valves located in the oxidant gas discharge passage are concentrically disposed, and by supplying hot air into the warm-up box.

As described above, the first aspect of the present invention provide a start control device for a fuel cell system, capable of quickly defrosting solenoids of the check valve and the discharge valve of the fuel cell and capable of saving time for warming up the entire fuel cell system, when these control valves are frozen by residual water because the fuel cell has been exposed to a low subzero temperature.

Accordingly, it is possible to conduct the warm-up operation by effectively utilizing the thermal energy obtained by adiabatic compression of the oxidant gas, without necessitating provision of particular devices for heating control valves.

In the start control device for the fuel cell according to the second aspect of the present invention, the oxidant gas heated by adiabatic compression can heat the control valves and the fuel cell so that it is possible to reduce the time for warming up the entire fuel cell system.

In the start control device of a fuel cell according to the third and fourth aspects, it is possible to prevent supplying unnecessary oxidant gas and to carry out defrosting operation efficiently.

In the start control device for the fuel cell according to the fifth aspect of the present invention, it is possible to determine whether the control valves are defrosted by detecting the gas pressure of the reaction gas in response to commands to open or close control valves.

In the control device for starting the fuel cell according to the sixth aspect of the present invention, the fuel cell is capable of executing normal power generation without being subjected to reduction of the power generation efficiency because the power generation the fuel cell starts after the smooth operations of control valves thereof are confirmed.

In the control device for starting the fuel cell according to the seventh aspect of the present invention, it is possible to prevent useless diffusion of the oxidant gas which would not contribute to heating operation of the control valves and thereby improving the heating efficiency.

What is claimed is:

1. A cell start control device for a fuel cell system comprising:
    an oxidant gas supply device for supplying to the fuel cell system a heated oxidant gas obtained by an adiabatic compression;
    control valves provided in a gas passage of the fuel cell system for discharging a reaction gas discharged from said fuel cell; and
    a control valve heating device for heating said control valves by heat exchange with said heated oxidant gas divisionally supplied from said oxidant gas supply device.

2. A cell start control device for a fuel cell system according to claim 1, wherein the cell start control device further comprises an oxidant gas flow dividing device for divisionally supplying said oxidant gas to a fuel cell and to the control valve heating device from said oxidant gas supply device.

3. A cell start control device for a fuel cell system according to claim 1, wherein the cell start control device for said fuel cell system further comprises:
- a defrosted state determination device for determining whether said control valves have been defrosted from a frozen state;
- an oxidant gas supply control device for supplying or for stopping the supply of said oxidant gas from said oxidant gas supply device to said control valve heating device;
- wherein said oxidant gas supply control device stops supplying said oxidant gas from said oxidant gas supply device to said control valve heating device when it is determined by said defrosted state determination device that said control valves are defrosted.

4. A cell start control device for a fuel cell system according to claim 2, wherein said cell start control device for said fuel cell system further comprises:
- a defrosted state determination device for determining whether said control valves have been defrosted from a frozen state;
- an oxidant gas supply control device for supplying or for stopping the supply of said oxidant gas from said oxidant gas supply device to said control valve heating device;
- wherein said oxidant gas supply control device stops supplying said oxidant gas from said oxidant gas supply device to said control valve heating device when it is determined by said defrosted state determination device that said control valves are defrosted.

5. A cell start control device for a fuel cell system according to claim 3, wherein said defrosted state determination device determines the defrosted state of said control valves according to a pressure of a reaction gas detected in response to control commands to open or to close said control valves.

6. A method of determining a defrosted state of control valves in a start control device for a fuel cell system, the fuel cell system comprises a fuel cell which generates electric energy by an electrochemical reaction of reaction gases composed of a fuel gas and an oxidant gas, gas passages for supplying said reaction gases to said fuel cell and for discharging the reaction gas from said fuel cell, the control valves provided in said gas passages for controlling a pressure of said gas passage, and a defrosted state determination device for determining a defrosted state of said control valves, said method comprising the steps of:
- (a) supplying said reaction gases to said fuel cell;
- (b) operating said control valves so as to open or close said control valves;
- (c) detecting a pressure inside of said gas passage in response to the opening or closing of said control valves; and
- (d) determining the defrosted state of said control valves according to said pressure inside of said gas passages.

7. A method according to claim 6, wherein said gas passages form a circulating passage for circulating said fuel gas and wherein the step (c) comprises detecting a pressure in said circulating passage.

8. A method according to claim 7, wherein said control valves comprise a check valve provided in said circulating passage and a purge valve provided in said circulating passage for purging the fuel gas outside of the system.

9. A fuel cell system provided with a start control device comprising:
- (a) a fuel cell for generating electric power by an electrochemical reaction of a reaction gas which comprises a fuel gas and an oxidant gas;
- (b) an oxidant gas supply device for supplying oxidant gas obtained by adiabatic compression to the fuel cell;
- (c) a fuel gas supply device for supplying said fuel gas to the fuel cell;
- (d) a plurality of control valves provided in a passage of a discharged reaction gas composed of said fuel gas and said oxidant gas discharged from said fuel cell; and
- (e) a box for receiving said plurality of control valves, in which said oxidant gas supplied by said oxidant gas supply device can be distributed.

* * * * *